United States Patent [19]

Jenkins et al.

[11] Patent Number: 4,523,939
[45] Date of Patent: Jun. 18, 1985

[54] METHOD FOR REDUCING STRIATIONS IN FUSED SILICA

[75] Inventors: Robert G. Jenkins, Acton; Dennis B. Shinn, Topsfield, both of Mass.

[73] Assignee: GTE Products Corporation, Stamford, Conn.

[21] Appl. No.: 568,517

[22] Filed: Jan. 9, 1984

Related U.S. Application Data

[63] Continuation of Ser. No. 235,829, Feb. 19, 1981, abandoned.

[51] Int. Cl.³ .............................................. C03B 20/00
[52] U.S. Cl. ............................................ 65/32; 65/86; 65/157
[58] Field of Search ................... 65/32, 86, 157, 347

[56] References Cited

U.S. PATENT DOCUMENTS 3,320,045  5/1967  Weiss et al. ...................... 65/32 X
3,717,450  2/1973  Loughridge et al. .............. 65/32 X
3,764,286  10/1973  Antczak et al. ................... 65/32 X Primary Examiner—S. Leon Bashore
Assistant Examiner—Michael K. Boyer
Attorney, Agent, or Firm—William H. McNeill; Carlo S. Bessone

[57] ABSTRACT

An improved method for melting silica material in a crucible and drawing off a fused silica tube therefrom having reduced air lines or striations. Bubble formation in the silica melt in the crucible is considerably reduced by supplying the exterior of the crucible with an atmosphere of hydrogen in a carrier gas of argon or certain other noble gases. The fused silica melt is discharged from the crucible around a hollow mandrel and a gas mixture of hydrogen in argon is fed within the hollow mandrel to the interior of the issuing silica tubing while the above atmosphere of hydrogen in argon is passed over the exterior of such silica tubing to form a silica tube product with markedly reduced striations.

14 Claims, 2 Drawing Figures

METHOD FOR REDUCING STRIATIONS IN FUSED SILICA

This application is a continuation of application Ser. No. 235,829, filed Feb. 19, 1981 now abandoned.

TECHNICAL FIELD

This invention relates to a method for continuously or intermittently forming a fused silica body from silica material so that the silica product has reduced striations therein, particularly a method for melting silica material in a heated container to obtain such fused silica product.

BACKGROUND ART

Several methods have been employed in the manufacture of silica tubing, e.g., by melting silica sand in a crucible and drawing off molten silica tubes which are subsequently solidified in a non-oxidizing atmosphere. Such method, though in wide commercial use, produces silica tubing having numerous trapped bubbles therein, known as air lines or striations. Such striations are highly undesirable in many applications of silica tubing, e.g., in lamp manufacture since the striations cause ridges, optical distortions, losses of strength and difficulties in sealing of tube ends which can be the cause of significant rejection rates and economic losses.

It has previously been believed that the main cause of bubbles in the molten silica resulted from gas entrapment in the void spaces of particulate or crystalline refractory materials, e.g., silica sand or quartz crystals which when poured on top of the molten silica mass in the melter caused the gases of the atmosphere in the melter to be trapped in pockets between such materials and carried into the melt as bubbles. Subsequent drawings of the melt into silica tubing then elongated the bubbles into striations as discussed above.

Commercial efforts to solve the above striation problems are well documented. For example, U.S. Pat. No. 3,717,450 discloses a process for the manufacture of quartz tubing having reduced striations therein in which filled, evacuated, fused silica tubes are successively lowered into a silica melt in a furnace with a need to continually replace the so-filled tubes. The furnace is surrounded in an atmosphere of non-oxidizing gas, e.g., 90% nitrogen -10% hydrogen. Such process, while successful, is partially intermittent and requires replacement of a succession of sand-filled quartz tubes as aforesaid.

In another attempt to reduce the striations in drawn fused silica tubing, U.S. Pat. No. 3,764,286 discloses feeding silica sand to the upper portion of a heated crucible onto a molten mass of silica in an atmosphere of 40-65% hydrogen and 60-35% helium, the crucible temperature being maintained above 2050° C. The crucible is surrounded by an atmosphere of hydrogen in at least 80% by volume of nitrogen. The fused silica is drawn from a lower zone of the crucible through such atmosphere to obtain the silica tube product. Such method, however, requires a relatively high percentage of hydrogen in the crucible atmosphere and further requires a tungsten-lined crucible which is expensive compared to molybdenum as a crucible material.

Accordingly, the methods of the prior art have been equipment-oriented, expensive attempts to solve the above striation problem, and there is a need and market for continuously forming a fused silica product having reduced striations therein that is economical, uncumbersome and obviates the above prior art shortcomings.

There has now been discovered a method for continuously or intermittently forming a fused silica product that is markedly reduced in striations, which method is a departure from the attempts of the prior art to reduce striations in fused silica products, which present method lends itself to mass production at reduced cost.

DISCLOSURE OF INVENTION

Accordingly, it is an object of this invention to obviate the disadvantages of the prior art.

It is another object of this invention to improve fused silica tubing.

These objects are accomplished, in one aspect of the invention, by the provision of a method for forming a fused silica body by feeding silica material into the upper portion of a crucible where the material is heated in an atmosphere of hydrogen and helium to form a silica melt which flows into a lower portion of the crucible to a discharge zone. The crucible is heated in an outside heating zone adjacent the crucible to over 1500° C.

The heating zone adjacent the crucible and the discharge zone are supplied with hydrogen and at least one noble gas. The silica melt is drawn from the crucible through the discharge zone in the above atmosphere of hydrogen and noble gas to form a fused silica body having reduced striations therein.

Advantageously, a hollow mandrel is positioned at the exit end of the crucible to shape the silica melt into a silica tube. Hydrogen and a noble gas are passed through the hollow mandrel and through the issuing silica tubing so that such tube is bathed inside and outside in an atmosphere of hydrogen and a noble gas, as it exits from the crucible and solidifies to form a silica tube with reduced striations.

By a noble gas, as used herein, is meant a gas selected from the group consisting of neon, argon, krypton, xenon and mixtures thereof. Preferably, argon is employed with hydrogen in the heating zone adjacent to the outside of the crucible and as the mandrel gas.

It has now been discovered that the prior art practice of employing nitrogen in the atmosphere adjacent the silica melting crucible is the cause of significant gas bubbles in the melt within the crucible, especially adjacent the crucible walls, which bubbles can contribute to the striations in the fused silica products. Examination of solidified fused silica melts produced in molybdenum crucibles showed large bubbles which had significant nitrogen content, especially near the sides of the melts. This latter fact indicated that nitrogen was diffusing through the molybdenum walls of the crucible, thereby contributing to the striation problems of the fused silica product.

It has further been found that nitrogen also permeates through tungsten crucibles, but at a considerably slower rate than through molybdenum crucibles.

It has further been found that employing the above noble gases in the heating zone around the crucible has eliminated the significant bubbles in the melt, especially near the crucible walls.

The above noble gases have virtually no permeation rate through molybdenum or tungsten crucibles and permit a silica melt greatly reduced in trapped bubbles with correspondingly reduced striations in the fused silica product.

The invention, accordingly, permits continuous addition of silica material to a heated molybdenum (or tungsten) crucible in exterior contact with an atmosphere of hydrogen and a noble gas in a heating zone, the silica melt being drawn off from a discharge zone of the crucible through an atmosphere of hydrogen and a noble gas to produce a fused silica product of reduced striations as discussed above.

BEST MODE FOR CARRYING OUT THE INVENTION

Figure 1:
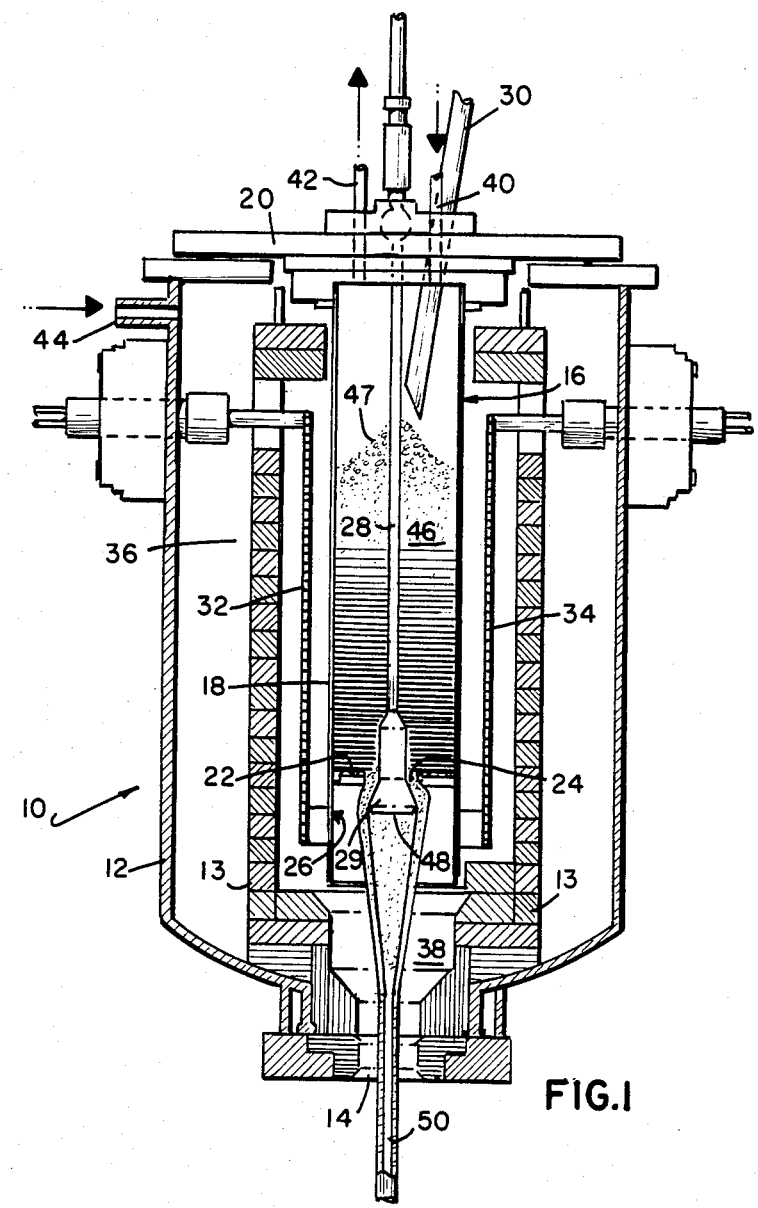
FIG. 1 is a sectional elevational view of a furnace that can be employed with the invention.

For a better understanding of the present invention, together with other and further objects, advantages and capabilities thereof, reference is made to the following disclosure and appended claims taken in conjunction with the above-described drawing.

Referring now to the drawing with greater particularity, the furnace 10 has a housing 12 which includes an exit port 14, a crucible 16 of molybdenum or tungsten, mounted therein, and which has sidewalls 18, a cover 20 and a bottom wall 22 having a discharge orifice 24 therein. A skirt 26 is mounted to the crucible 16 around the bottom thereof.

Mounted in the cover 20 and extending through the crucible 16 and through the discharge orifice 24 is a hollow mandrel 28 of refractory metal. Also mounted in the cover 20 and extending into the crucible 16 is a sand feeder tube 30.

Mounted in the space between the furnace housing 12 and the crucible 16 are a plurality of tungsten mesh heater elements 32 and 34 as described in U.S. Pat. No. 2,178,665.

The annular space between the crucible 16 and the furnace housing 12 is the heater chamber or heating zone 36 and the space below the discharge orifice 24 is the discharge zone 38 of the furnace 10.

The metal crucible cover 20 has an inlet gas port 40 and an outlet gas port 42 therein. The heater chamber 36 has a gas inlet duct 44.

The furnace housing 12 preferably is of steel with suitable ceramic brick insulation 13 disposed between the heater element 32 and the housing 12. Electric power is supplied to the tungsten elements by means not shown.

In operation the heater elements 32 and 34 are activated and the crucible 16 is heated to, e.g., about 2,000° C. A gas mixture of, e.g., 5% hydrogen and 95% helium by volume is admitted to the crucible through the inlet gas port 40 and exits from the crucible through the outlet gas port 42. A heating zone gas of, e.g., 5% hydrogen and 95% argon by volume, is admitted to the heater chamber 36, at the gas inlet port 44.

A mandrel gas of, e.g., 2% hydrogen and 98% argon by volume, is passed through the mandrel, and the mandrel gas and the heating zone gases exit from the furnace housing 12 at the exit port 14.

Silica material is admitted through the feeder tube 30 into the crucible 16 and forms a molten mass or silica melt 46. The silica material continues to flow through the feeder tube 30 to form a cone 47 atop the molten silica mass 46. The melt continuously flows down the crucible and exits through the orifice 24 and flows around the hollow mandrel flare portion 29 where it forms a hollow bulge of fused silica 48 in the discharge zone 38 and then is drawn out of the passage 14 of the furnace housing 12 as a fused silica tube 50, by means not shown.

As indicated above, the silica material is melted under a continuous flowing atmosphere of helium mixed with hydrogen. Concurrently, the crucible 16 is surrounded by an atmosphere of hydrogen in argon which enters the heating zone at gas inlet port 44 and continuously flows down to the discharge zone 38. The heater chamber gases then mix with the gases escaping from the hot fused silica (exiting from the crucible), e.g., helium and hydrogen, and exit from the furnace through the port 14. The so-exiting gases bathe the exiting fused silica tube 50 from without while the mandrel gases of hydrogen and argon bathe the tube 50 from within.

Various shaped mandrels, hollow or solid, can be used in the method of the invention or the mandrel can be omitted if desired, within the scope of the invention.

As indicated, this method considerably reduces air lines or striations in the fused silica product in a continuous process which readily adapts to mass production. Further, the need for expensive tungsten crucibles is avoided.

All gas percentages herein are by volume including the following:

The crucible atmosphere can contain 1% to 80% hydrogen in 99% to 20% helium and preferably contains 5% to 50% hydrogen in 95% to 50% helium.

The heating zone atmosphere can contain 2% to 20% hydrogen in 98% to 80% noble gas and preferably contains 5% to 10% hydrogen in 95% to 90% noble gas.

The mandrel gas can contain 0% to 20% hydrogen in 100% to 80% noble gas and preferably contains 0.5% to 3% hydrogen in 99.5% to 97% noble gas.

The above noble gas is preferably argon, but can be one or more of neon, krypton or xenon or a combination thereof, in any desired proportion.

This method is suitable for use in intermittent processes as well as continuous processes for melting silica material into a fused silica product having reduced striations therein.

The silica material employed herein includes all silica particles, glasses, or sand having a silica content greater than 96% by weight and a melting temperature greater than 1500° C.

The crucible is operated at a temperature range between 1500 and 2100° C.

The following example is intended to illustrate the method of the present invention and should not be construed in limitation thereof.

EXAMPLE I

In a production melter with a molybdenum crucible and molybdenum mandrel capable of producing a salable fused silica tubing (18.35 mm ID × 1.5 mm wall) at the rate of 500 lbs. per day from silica sand, the following gases were employed:

A crucible gas atmosphere of 5% by volume hydrogen in helium and a flow rate of 31.6 CFH was employed. The mandrel gas employed was 2% hydrogen in the conventional carrier gas, nitrogen, at 2.2 CFH. The heater chamber gas also employed the conventional nitrogen carrier gas with 5% hydrogen at 227 CFH through such heater chamber.

Figure 2:
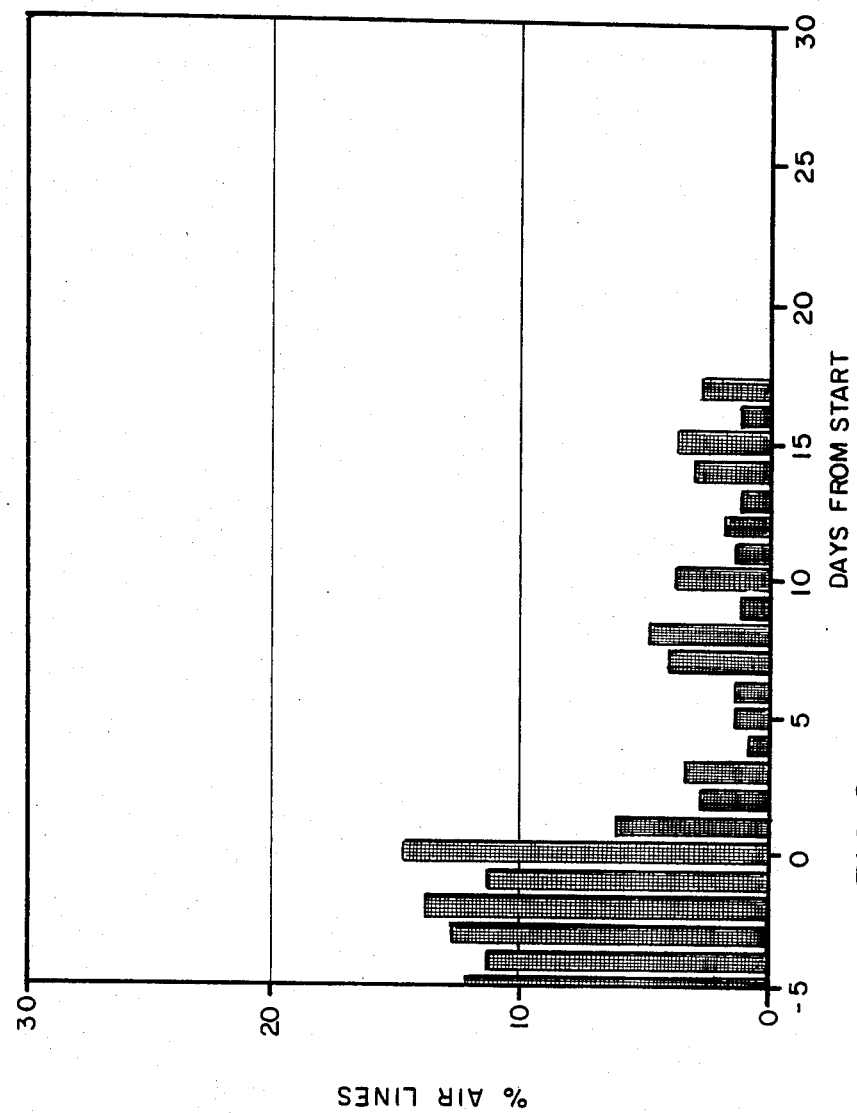
FIG. 2 is a bar graph illustrating the production of striations in a prior art process and the process of the invention.

The above prior art process was used as a control and resulted in a product having excessive air lines or striations in the resulting fused silica tubing (see FIG. 2).

The above process was repeated (also with a molybdenum crucible and molybdenum mandrel) employing the same crucible gas atmosphere and flow rate and with all other conditions being the same except the following: The mandrel gas was changed to 1.7% hydrogen in argon at a rate of 4 CFH and the heater chamber gas was changed to 5% hydrogen in argon, again at 227 CFH through the heater chamber. The crucible temperature was about 1960° C.

The following results were obtained:

a. By the latter method fused silica tubing production was continued without interruption, with a low rate of rejection.

b. The air line populations or striations in the silica tubes decreased to levels considerably below those obtained in the former method with nitrogen as the carrier gas (see FIG. 2).

c. The surface striations of the fused silica tubing nearly all disappeared.

d. A 3.76% reduction in power was achieved because of the decreased removal of heat by the argon (relative to the nitrogen).

The decrease in the air lines achieved by the present invention is illustrated in the graph of FIG. 2. The percent of air lines is computed by dividing the total length of all air lines in a given sample by the total length of the sample and multiplying by 100.

The data presented to the left of the zero indicate air lines in a production molybdenum crucible where nitrogen was used in the heating zone. The data to the right of the zero illustrate the dramatic reduction in the air lines after a noble gas (argon) was employed in the heating zone.

The air lines that remain in the fused silica product made by the process of the present invention are smaller than when such product was made with nitrogen as the carrier gas and the nitrogen content is lower. And, such striations that remain are within acceptable limits.

As indicated, the process of the invention applies to intermittent and continuous processes for forming fused silica products and can readily be employed in industrial productin of quartz products having a low degree of striations.

While there have been shown and described what are at present considered the preferred embodiments of the invention, it will be apparent to those skilled in the art that various changes and modifications can be made herein without departing from the scope of the invention as defined by the appended claims.

What is claimed is:

1. In a method for forming a fused silica body having reduced striations by feeding silica material into an upper portion of a crucible and heating said material in a first atmosphere of hydrogen and helium to form a silica melt which flows into a lower portion of said crucible to a discharge zone, said crucible being heated by a heating means mounted outside of said crucible in a heating zone which extends adjacent to said crucible, the improvement comprising: supplying said heating zone and said discharge zone with a second atmosphere consisting essentially of hydrogen and at least one noble gas selected from the group consisting of neon, argon, krypton, xenon, and mixtures thereof and drawing said melt from said crucible through said discharge zone and said second atmosphere to form a fused silica body.

2. The method of claim 1 wherein said material is fed continuously and said melt is drawn continuously from said crucible in a continuous process.

3. The method of claim 1 wherein said silica is fused in an intermittent process.

4. The method of claim 1 wherein said crucible is made of molybdenum.

5. The method of claim 1 wherein said heating zone extends around said crucible.

6. The method of claim 1 wherein said heating means heats said crucible to a temperature between 1500° to 2100° C.

7. The method of claim 1 wherein said melt is discharged from said crucible around a mandrel to shape said melt into a fused silica tube.

8. The method of claim 7 wherein said mandrel is hollow and an atmosphere consisting essentially of hydrogen and said noble gas are passed through said mandrel and through said fused silica tube.

9. The method of claim 8 wherein said noble gas is argon and said hydrogen and argon are present in the volume ratios of 0.5% to 3% hydrogen and 99.5% to 97% argon and are passed through said hollow mandrel and said fused silica tube.

10. The method of claim 8 wherein said atmosphere from said heating zone is directed to surround the fused silica body exiting from said crucible.

11. The method of claim 1 wherein the atmosphere in the crucible includes hydrogen and helium in the volume ratios of 5% to 50% hydrogen and 95% to 50% helium.

12. The method of claim 4 wherein said noble gas is argon.

13. The method of claim 4 wherein said second atmosphere contains hydrogen and argon in the volume ratios of 5% to 10% hydrogen and 95% to 90% argon.

14. The method of claim 4 wherein said silica material is silica sand having a silica content greater than 96% by weight.

* * * * *